(12) United States Patent
Ali et al.

(10) Patent No.: US 12,389,290 B2
(45) Date of Patent: Aug. 12, 2025

(54) ENHANCED INTER-WORKING OF CHO AND DAPS FEATURES

(71) Applicant: Nokia Technologies Oy, Espoo (FI)

(72) Inventors: Amaanat Ali, Espoo (FI); Srinivasan Selvaganapathy, Bangalore (IN); Ahmad Awada, Munich (DE); Jedrzej Stanczak, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 378 days.

(21) Appl. No.: 17/999,322

(22) PCT Filed: Jun. 16, 2021

(86) PCT No.: PCT/FI2021/050451
§ 371 (c)(1),
(2) Date: Nov. 18, 2022

(87) PCT Pub. No.: WO2022/018323
PCT Pub. Date: Jan. 27, 2022

(65) Prior Publication Data
US 2023/0189097 A1   Jun. 15, 2023

(30) Foreign Application Priority Data

Jul. 24, 2020   (IN) .............................. 202041031718

(51) Int. Cl.
*H04W 36/00* (2009.01)
*H04W 36/18* (2009.01)
(Continued)

(52) U.S. Cl.
CPC ... *H04W 36/00837* (2018.08); *H04W 36/185* (2023.05); *H04W 36/362* (2023.05); *H04W 80/12* (2013.01)

(58) Field of Classification Search
None
See application file for complete search history.

(56) References Cited

U.S. PATENT DOCUMENTS

2020/0022035 A1   1/2020  Kadiri et al.
2020/0344657 A1*  10/2020 Paladugu .......... H04W 12/0433
(Continued)

FOREIGN PATENT DOCUMENTS

WO   2019/161099 A1   8/2019
WO   2020/070373 A1   4/2020

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.
(Continued)

*Primary Examiner* — Mohammad S Adhami
(74) *Attorney, Agent, or Firm* — Lippes Mathias LLP

(57) ABSTRACT

The example embodiments of the invention provide at least a method and apparatus to perform determining, by a network node of a communication network, information including a conditional handover configuration and a target dual active protocol stack handover configuration for a handover of user equipment in the communication network, wherein the information includes at least one triggering condition associated with the handover to be met for application of the target dual active protocol stack handover configuration for the handover; and sending toward the user equipment the information for use by the user equipment with the handover. In addition, example embodiments of the invention provide at least a method and apparatus to perform receiving, by a user equipment of a communication network, from a network node information including a conditional handover configuration and a target dual active protocol
(Continued)

stack handover configuration for use with a handover of the user equipment in the communication network, wherein the information includes at least one triggering condition associated with the conditional handover to be met for application of the target dual active protocol stack handover configuration for the handover; and based on the information, performing operations for the handover.

14 Claims, 8 Drawing Sheets

(51) Int. Cl.
 *H04W 36/36* (2009.01)
 *H04W 80/12* (2009.01)

(56) References Cited

U.S. PATENT DOCUMENTS

2023/0097891 A1* 3/2023 Zhang ............. H04W 36/00837
 370/331
2023/0110446 A1* 4/2023 Ohlsson ............. H04W 36/362
 455/442

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP Ts 36.300, V16.1.0, Mar. 2020, pp. 1-386.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.0.0, Mar. 2020, pp. 1-1048.

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.

"3rd Generation Partnership Project; Technical Specification Group Radio Access Network; Evolved Universal Terrestrial Radio Access Network (E-Utran); X2 application protocol (X2AP) (Release 16)", 3GPP TS 36.423, V16.1.0, Mar. 2020, pp. 1-438.

"Msc-generator", Source Forge, Retrieved on Nov. 25, 2022, Webpage available at : https://sourceforge.net/projects/msc-generator/.

International Search Report and Written Opinion received for corresponding Patent Cooperation Treaty Application No. PCT/FI2021/050451, dated Oct. 28, 2021, 16 pages.

"Combination of CHO and DAPS HO", 3GPP TSG-RAN WG2 Meeting #109 electronic, R2-2000923, Agenda: 6.9.3.1, CMCC, Feb. 24-Mar. 6, 2020, 5 pages.

"Combination of CHO and DAPS", 3GPP TSG-RAN WG2 #108, R2-19xxxxx, Agenda: 6.9.3.3, NEC, Nov. 18-22, 2019, 4 pages.

* cited by examiner

ENHANCED INTER-WORKING OF CHO AND DAPS FEATURES

RELATED APPLICATION

This application was originally filed as PCT Application No. PCT/FI2021/050451, filed on 16 Jun. 2021, which claims priority from India application No. 202041031718, filed on 24 Jul. 2020, each of which is incorporated herein by reference in its entirety.

TECHNICAL FIELD

The teachings in accordance with the exemplary embodiments of this invention relate generally to a dual active protocol stack configuration of a source cell and informing a master node about the start of dual active protocol stack handover, and more specifically relate to a dual active protocol stack configuration of a source cell and informing a source cell or a master node about the start of a dual active protocol stack handover where the source node configures user equipment with a condition on when to apply the reduced dual active protocol stack configuration of the source cell and inform the source cell or a master node about the start of a dual active protocol stack handover.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
CHO Conditional Handover
DAPS Dual Active Protocol Stack
DRB Data Radio Bearer
HO Handover
HOF Handover Failure
LTE Long Term Evolution
MN Master Node
NR New Radio
PCell Primary Cell
PDCP Packet Data Convergence Protocol
RACH Random Access
RLC Radio Link Control
RLF Radio Link Failure
RSRP Reference Signal Received Power
RSRQ Reference Signal Received Quality
RX Reception
SCell Secondary Cell
SDU Service Data Unit
SINR Signal-to-Interference Noise Ratio
TX Transmission
UE User Equipment Wireless communications systems are widely deployed to provide various types of communication capabilities for devices including user equipment and other network devices using multiple-access systems of a network to communicate with one another. Examples of such multiple-access systems include 4G systems such as Long Term Evolution (LTE) type systems, and 5G systems which may be referred to as New Radio (NR) systems. A wireless multiple-access communications system may include a number of base stations or network access nodes to support these communication devices and systems.

In certain cases, the communication devices such as UE may be required to perform a handover in these multi-access systems. In certain cases, the handover can be a dual active protocol stack handover or a conditional handover. However, there are still issues remaining with these types of handovers in technologies at the time of this application.

Example embodiments of the invention as disclosed herein work to at least address these issues and improve these operations.

SUMMARY

This section contains examples of possible implementations and is not meant to be limiting.

In an example aspect of the invention, there is an apparatus, such as a network side apparatus, comprising: at least one processor; and at least one memory including computer program code, where the at least one memory and the computer program code are configured, with the at least one processor, to cause the apparatus to at least: determine, by a network node of a communication network, information comprising a conditional handover configuration and a target dual active protocol stack handover configuration for a handover of user equipment in the communication network, wherein the information comprises at least one triggering condition associated with the handover to be met for application of the target dual active protocol stack handover configuration for the handover; and send toward the user equipment the information for use by the user equipment with the handover.

In another example aspect of the invention, there is a method comprising: determining, by a network node of a communication network, information comprising a conditional handover configuration and a target dual active protocol stack handover configuration for a handover of user equipment in the communication network, wherein the information comprises at least one triggering condition associated with the handover to be met for application of the target dual active protocol stack handover configuration for the handover; and sending toward the user equipment the information for use by the user equipment with the handover.

A further example embodiment is an apparatus and a method comprising the apparatus and method of the previous paragraphs, wherein the information comprises a source dual active protocol stack handover configuration and a triggering condition for applying the source dual active protocol stack handover configuration, wherein the at least one trigger condition comprises: a first condition informing the user equipment a point at which to execute the source dual active protocol stack configuration for the handover; and a second condition informing the user equipment a point at which to execute the target dual active protocol stack configuration for the handover, wherein the handover comprises a conditional handover, wherein the first condition is set for at least one of a radio condition or an absolute time from reception of the dual active protocol stack configuration and the conditional handover configuration, wherein the first condition is set based on an absolute time from the reception of at least one of the conditional handover configuration or the target dual active protocol stack handover configuration, wherein the first condition is based on a dB offset relative to the conditional handover configuration, wherein the first condition is set based on measurements of a serving cell and a neighbor cell and a second offset from reception by the user equipment of the conditional handover configuration, wherein triggering the second condition is triggering the handover execution when Mn>Ms+Off2, where Off2 is the second offset, and where Mn and Ms are measurements of a neighbouring cell and a serving cell, respectively, wherein the first condition is the same as the second condition but with a first offset from reception of the conditional handover configuration being smaller than the second offset, wherein Mn>Ms+Off1 where Off1<Off2, where Off1 is the first offset, Off2 is the second offset, and where Mn and Ms are the measurement of a neighbouring cell and a serving cell, respectively, wherein there is receiving from the user equipment an indication of the first condition being met; and receive another indication of the source dual active protocol stack handover configuration being used based on the first condition being met.

A non-transitory computer-readable medium storing program code, the program code executed by at least one processor to perform at least the method as described in the paragraphs above.

In another example aspect of the invention, there is an apparatus comprising: means for determining, by a network node of a communication network, information comprising a conditional handover configuration and a target dual active protocol stack handover configuration for a handover of user equipment in the communication network, wherein the information comprises at least one triggering condition associated with the handover to be met for application of the target dual active protocol stack handover configuration for the handover; and means for sending toward the user equipment the information for use by the user equipment with the handover.

In accordance with the example embodiments as described in the paragraph above, at least the means for determining and sending comprises a network interface, and computer program code stored on a computer-readable medium and executed by at least one processor.

In another example aspect of the invention, there is an apparatus, such network node apparatus, comprising: at least one processor; and at least one memory including computer program code, where the at least one memory and the computer program code are configured, with the at least one processor, to cause the apparatus to at least: receive, by a user equipment of a communication network, from a network node information comprising a conditional handover configuration and a target dual active protocol stack handover configuration for use with a handover of the user equipment in the communication network, wherein the information comprises at least one triggering condition associated with the conditional handover to be met for application of the target dual active protocol stack handover configuration for the handover; and based on the information, perform operations for the handover.

In another example aspect of the invention, there is method, comprising: receiving, by a user equipment of a communication network, from a network node information comprising a conditional handover configuration and a target dual active protocol stack handover configuration for use with a handover of the user equipment in the communication network, wherein the information comprises at least one triggering condition associated with the conditional handover to be met for application of the target dual active protocol stack handover configuration for the handover; and based on the information, performing operations for the handover.

A further example embodiment is an apparatus and a method comprising the apparatus and method of the previous paragraphs, wherein the information comprises a source dual active protocol stack handover configuration and a triggering condition for applying the source dual active protocol stack handover configuration, wherein the at least one trigger condition comprises: a first condition informing the user equipment a point at which to execute the source dual active protocol stack configuration for the handover; and a second condition informing the user equipment a point at which to execute the target dual active protocol stack configuration for the handover, wherein the handover comprises a conditional handover, wherein the first condition is set for at least one of a radio condition or an absolute time from reception of the dual active protocol stack configuration and the conditional handover configuration, wherein the first condition is set based on an absolute time from the reception of at least one of the conditional handover configuration or the target dual active protocol stack handover configuration, wherein the first condition is set based on a dB offset relative to the conditional handover configuration, wherein the first condition is set based on measurements of a serving cell and a neighbor cell and a second offset from reception by the user equipment of the conditional handover configuration, wherein triggering the second condition is triggering the handover execution when Mn>Ms+Off2, where Off2 is the second offset, and where Mn and Ms are measurements of a neighbouring cell and a serving cell, respectively, wherein the first condition is the same as the second condition but with a first offset from reception of the conditional handover configuration being smaller than the second offset, wherein Mn>Ms+Off1 where Off1<Off2, where Off1 is the first offset, Off2 is the second offset, and where Mn and Ms are the measurement of neighbouring cell and a serving cell, respectively, there is, based on the first condition being met, applying the source dual active protocol stack configuration, wherein there is communicating with the network node an indication of applying the source dual active protocol stack configuration based on the first condition being met, wherein there is applying the target dual active protocol stack configuration and perform the conditional handover, and wherein there is applying the target dual active protocol stack configuration based on the second condition being met.

A non-transitory computer-readable medium storing program code, the program code executed by at least one processor to perform at least the method as described in the paragraphs above.

In another example aspect of the invention, there is an apparatus comprising: means for receiving, by a user equipment of a communication network, from a network node information comprising a conditional handover configuration and a target dual active protocol stack handover configuration for use with a handover of the user equipment in the communication network, wherein the information comprises at least one triggering condition associated with the conditional handover to be met for application of the target dual active protocol stack handover configuration for the handover; and means, based on the information, for performing operations for the handover.

In accordance with the example embodiments as described in the paragraph above, at least the means for receiving and performing comprises a network interface, and computer program code stored on a computer-readable medium and executed by at least one processor.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

In this invention, example embodiments of the invention provide at least a method and apparatus to improve performance for a handover such as but not limited to a dual active protocol stack or a conditional handover. Example embodiments of the invention provide improvements including determination of a condition on when to apply and when to apply a configuration at user equipment to perform a handover such as a dual active protocol stack handover or a conditional handover for the user equipment.

In the following there is provided an overview of CHO and DAPS.

Conditional Handover

Figure 1:
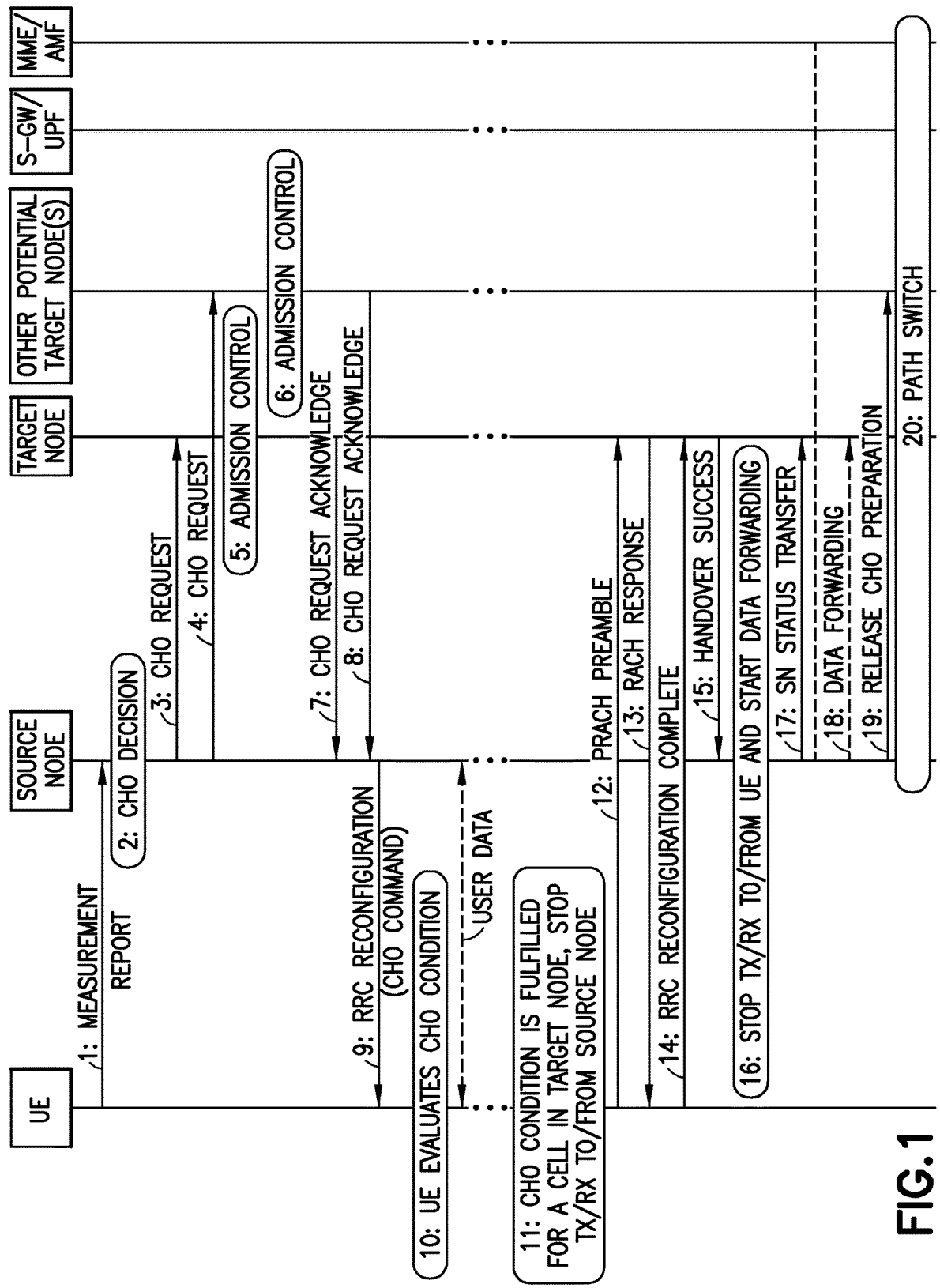
FIG. 1 shows an exemplary message sequence chart for a conditional handover.

FIG. 1 shows an exemplary message sequence chart for conditional handover. The first steps 1-9 of FIG. 1 are similar to a baseline handover procedure of NR Rel. 15. A configured event triggers the UE to send a measurement report. Based on this report, the source node can prepare one or more target cells for the handover (CHO Request+CHO Request Acknowledge) and then sends an RRC Reconfiguration (CHO command) to the UE.

For baseline handover of NR Rel. 15, the UE will immediately access the target cell to complete the handover. Instead, for CHO, the UE will only access the target cell once an additional CHO execution condition expires (i.e. the HO preparation and execution phases are decoupled). The condition is configured by the source node in HO Command.

Once the UE completes the handover execution to the target cell (e.g. UE has sent RRC Reconfiguration Complete), the target cell sends to the source cell "Handover Success" indication. When receiving this indication from target cell, source cell stops its TX/RX to/from UE and starts data forwarding to target cell in step 18 of FIG. 1. Moreover, the source may release the CHO preparations in other target nodes/cells (which are no longer needed) when it receives "HO Success" indication.

The advantage of the CHO is that the HO command can be sent very early, when the UE is still safe in the source cell, without risking the access in the target cell and the stability of its radio link. That is conditional handover provides mobility robustness.

DAPS Handover

Figure 2:
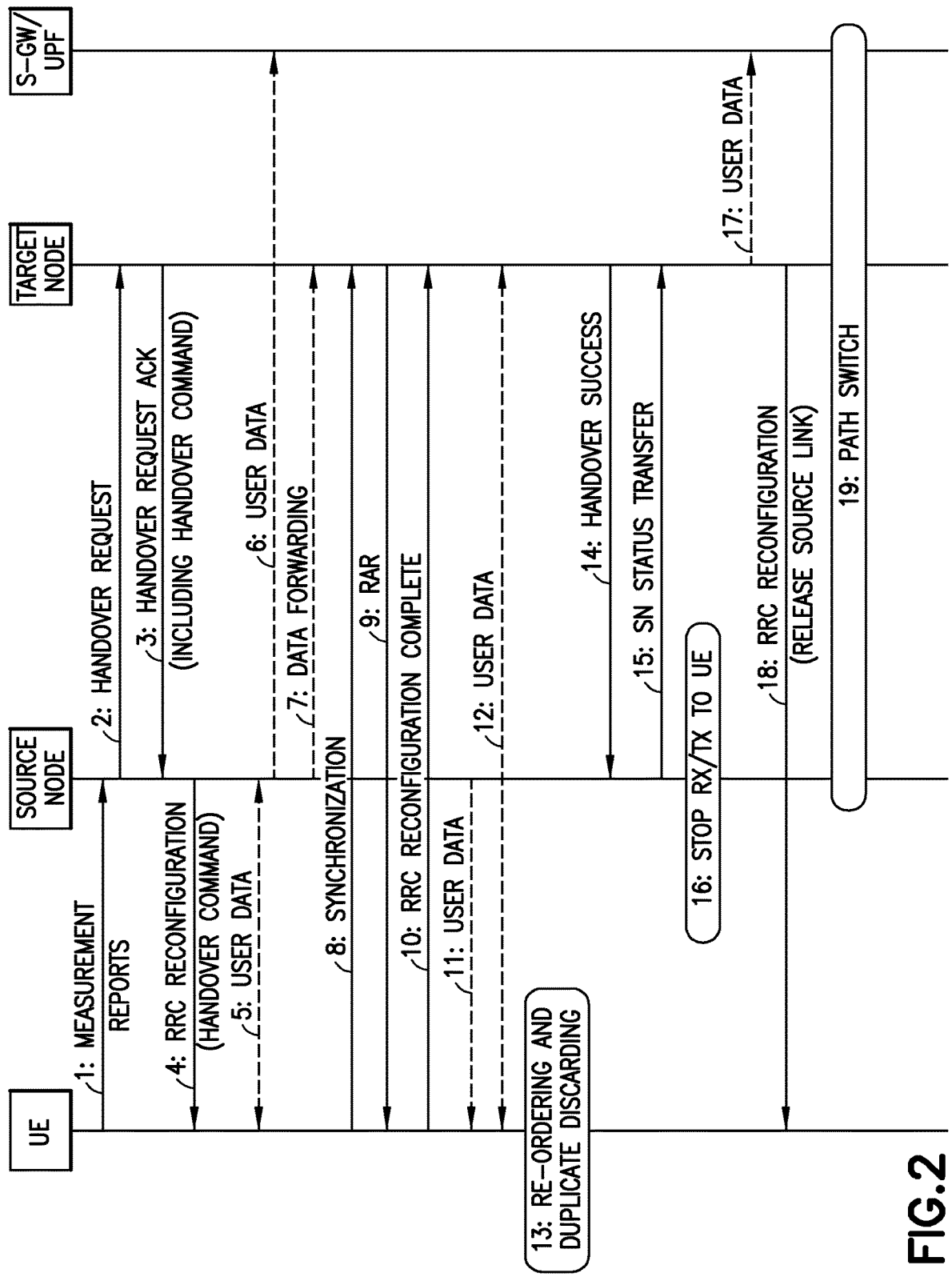
FIG. 2 shows a dual active protocol stack signalling flow.

DAPS solution has been introduced in Rel. 16 to achieve close to 0 ms interruption time in downlink (DL) and uplink (UL). The signalling diagram of DAPS handover is shown in FIG. 2. Herein, each of the source and target cell has full L2 protocol stack with own security key for ciphering and deciphering of the Packet Data Convergence Protocol (PDCP) Service Data Units (SDUs). To avoid a hard handover causing service interruption, the UE should establish a new radio link with respect to the target cell (step 8-10 of FIG. 2) before detaching the radio link of the source cell (step 18 of FIG. 2). That is for some time before releasing the source cell, the UE would be exchanging data with both source and target nodes (step 11-12 of FIG. 2).

In DAPS, the UE switches the UL user plane (transmission of new PDCP SDU) to the target cell when random access to the target cell is completed. All other UL signalling, e.g., CSI feedback, PDCP status report, HARQ feedback, continues between the UE and the source cell until it is released.

As a summary:

DAPS Handover allows the UE to continue the source PS (Protocol Stack) operation until the HO execution is completed to the target cell. The configurations of the source and target cell shall be reduced during DAPS handover in order to stay within the UE capabilities. To this end, Secondary Cells (SCells) used for Carrier aggregation (CA) or Dual Connectivity (DC) in source cell shall be released by the UE when performing DAPS and no SCells are configured for target cell during DAPS execution; and Conditional handover allows the UE to continue source cell operation until the CHO triggering condition is met.

The combination of CHO and DAPS solutions would be useful to provide both mobility robustness and interruption time reduction during the handover. This combination has been discussed in Rel. 16 but not specified yet though is expected to be specified in future 3GPP releases.

Figure 3:
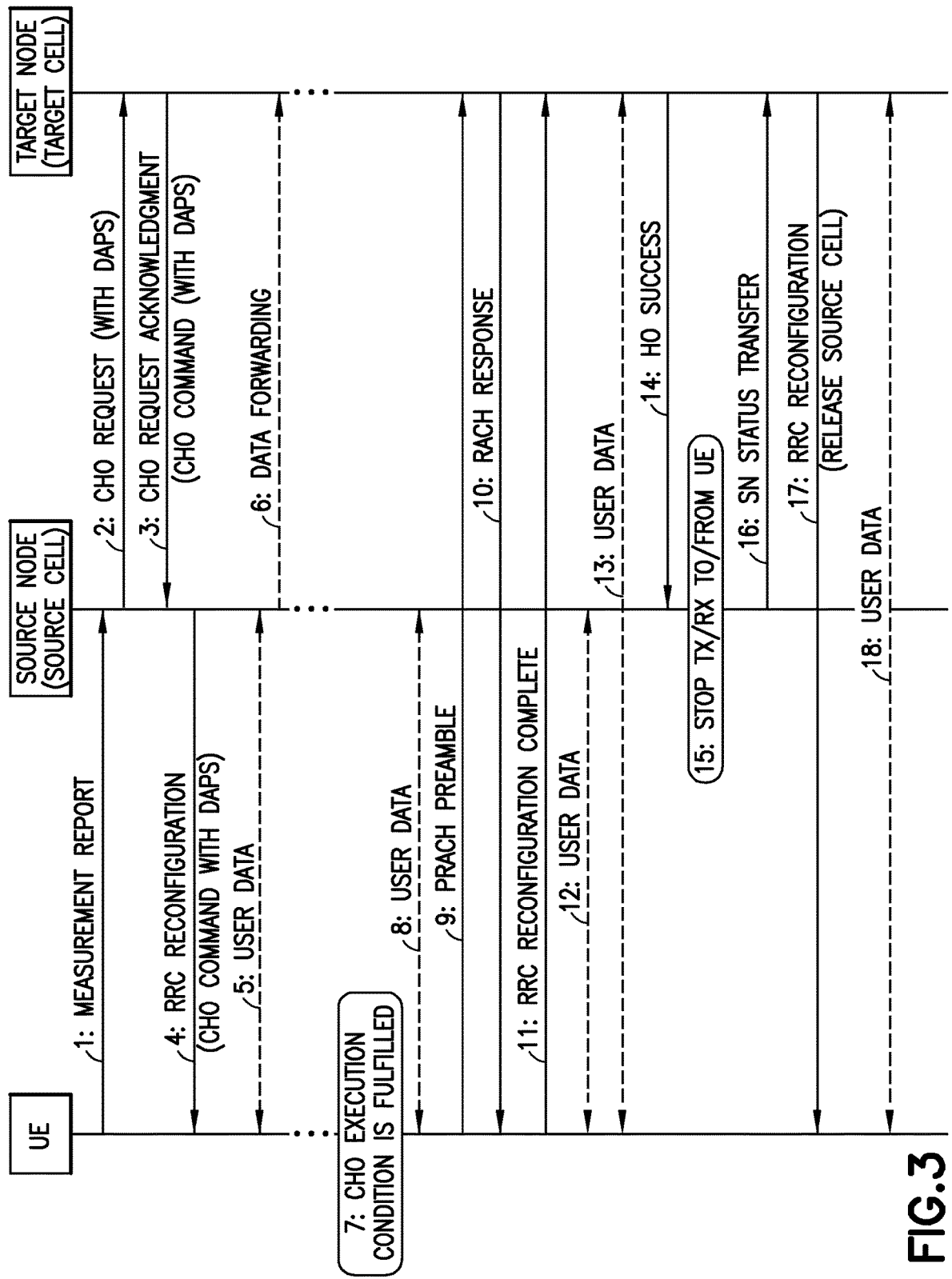
FIG. 3 shows a combination of conditional handover and dual active protocol stack handover solutions.

FIG. 3 shows Combination of conditional handover and dual active protocol stack handover solutions. An exemplary implementation for the combination of CHO and DAPS solutions can be implemented in view of FIG. 3.

FIG. 3 shows a combination of conditional handover and dual active protocol stack handover solutions. As shown in FIG. 3:

Upon receiving a CHO request for DAPS handover, the target cell provides a CHO command with DAPS configuration in step 3 of FIG. 3;

After receiving the CHO command with DAPS from the source cell in step 4, UE continues to exchange user data with the source cell and evaluates the CHO execution condition provided by the source cell in step 4 of FIG. 3;

Once the CHO execution condition is met in step 7, the UE continues to exchange user data with the source cell while completing the RACH access to the target cell in step 9-11 of FIG. 3;

The remaining steps are the same as DAPS handover shown in FIG. 2.

When DAPS HO is configured as conditional configuration, the key steps in the process of handover execution are described in the following:

Step 1 (T1): Reception of CHO command with DAPS configuration (RRC reconfiguration);

Step 2 (T2): UE applying DAPS configuration and starts source DAPS operation with reduced configuration (release of SCells if any, PDCP-DAPS with DAPS forwarding, SRB suspension, etc.).; and Step 3 (T3): Target access and CHO Handover execution.

In case of CHO+DAPS, one option would be to start DAPS handover at the time of CHO execution. In this case, T2 and T3 will be same. But UE needs to inform source on start of DAPS and NW should also apply source DAPS configuration. Radio condition at T3 (CHO execution condition) for the source cell may not be reliable. In this case, the UE may apply the DAPS configuration and the source cell may not receive the indication from the UE about the start of DAPS which may lead to a mismatch in configurations. This may cause system failures preventing the features from being applied together at the same time.

It is noted that to solve the issues mentioned above alternative solutions are needed to improve the robustness of all the steps of DAPS-CHO. Example embodiments of the invention address at least these solutions.

Improvement of CHO+DAPS combination is an important asset for IIOT/AR/XR applications as these complementary DAPS and CHO features in Rel-16 solve different problems separately and their inter-working is an aspect of study in future 3GPP releases.

In the prior art at the time of this application there is:
CHO feature in Rel-16;
DAPS feature in Rel-16; and
In Rel-16, the inter-working of CHO+DAPS combination is not specified Another approach at the time of this application is to apply reduced DAPS immediately after delivering the CHO command. That is T1 where there is reception of CHO command with DAPS configuration (RRC reconfiguration and T2 where UE applying DAPS configuration and starts source DAPS operation with reduced configuration occur at the same time:

Source node sends RRC-Reconfiguration message containing CHO configuration for target DAPS along with reduced source configuration and an indication to start DAPS;

UE receiving RRC-Reconfiguration message knows that it contains DAPS-CHO and applies the reduced configuration immediately, e.g., UE releases SCells upon receiving RRC Reconfiguration message; and When the CHO execution condition is met, UE applies the target configuration and starts the access to the target cell, without detaching from the source cell.

A main benefit of this approach is that the UE does not need to inform the source cell about the start of DAPS as DAPS has been already started when delivering the CHO command. This ensures reliable DAPS execution with lesser chances of failure to apply DAPS.

However, it is noted that this approach has the following drawbacks:

UE starts with reduced source configuration from the reception of CHO command itself. This results in reduced UE throughput for the duration between CHO command reception till CHO execution which can be up to several seconds;

Source node has to start early forwarding from the reception of the CHO command itself. This results in longer window where source node performs data forwarding to the prepared target cells with DAPS; and When some of target cells are prepared with DAPS and some other without DAPS, source may use the reduced configuration unnecessarily without knowing the target cell for which the UE will perform CHO.

Example embodiments of the invention propose a solution where the source node configures the UE with a condition on when to apply the reduced DAPS configuration of the source cell and inform the source master node (MN) about the start of DAPS handover. When the CHO execution condition is met later, the UE applies the DAPS target cell configuration and performs RACH access.

In addition, example embodiments of this invention addresses mobility in a cellular and mobile communication system such as new radio (NR) and Long Term Evolution (LTE). More specifically, it relates to so-called "conditional handover" (CHO) and Dual Active Protocol Stack (DAPS) handover which have been specified for NR and LTE in Rel. 16. CHO aims at improving mobility robustness by reducing the number of radio link failures (RLFs) or handover failures (HOFs), whereas DAPS reduces the interruption time close to 0ms in DL and UL during a handover.

Figure 6:
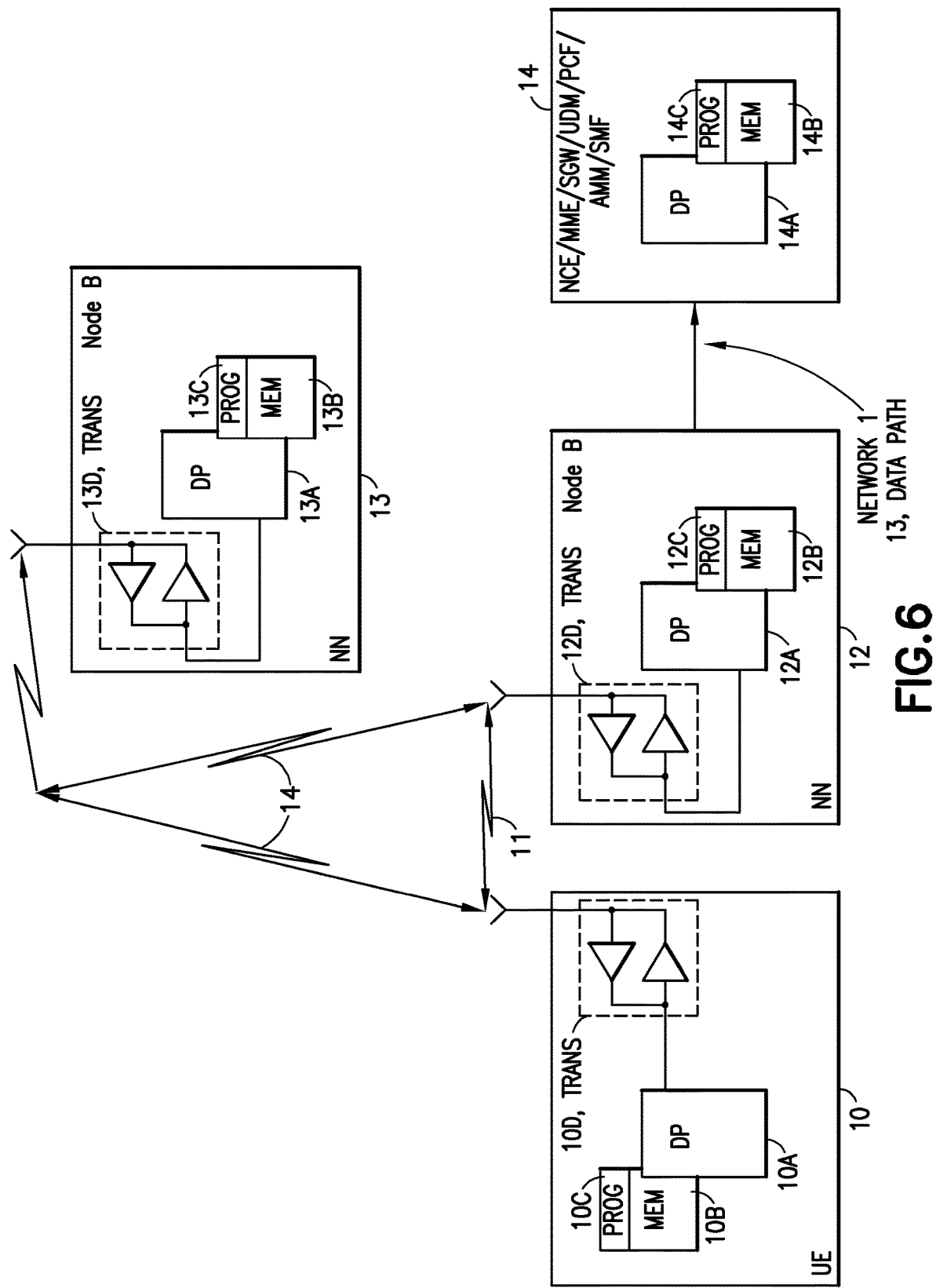
FIG. 6 shows a high level block diagram of various devices used in carrying out various aspects of the invention.

Before describing the example embodiments of the invention in detail, reference is made to FIG. 6 for illustrating a simplified block diagram of various electronic devices that are suitable for use in practicing the example embodiments of this invention.

FIG. 6 shows a block diagram of one possible and non-limiting exemplary system in which the example embodiments of the invention may be practiced. In FIG. 6, a user equipment (UE) 10 is in wireless communication with a wireless network 1. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 18 to NN 12 and NN 13, respectively. The one or more memories MEM 10B include computer program code PROG 10C. The UE 10 communicates with NN 12 and/or NN 13 via a wireless link 111.

The NN 12 (NR/5G Node B, an evolved NB, or LTE device) is a network node such as a master or secondary node base station (e.g., for NR or LTE long term evolution) that communicates with devices such as NN 13 and UE 10 of FIG. 6. The NN 12 provides access to wireless devices such as the UE 10 to the wireless network 1. The NN 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 with the UE 10. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13. Further, the link 11 and or any other link may be wired or wireless or both and may implement, e.g., an X2 or Xn interface. Further the link 11 may be through other network devices such as, but not limited to an NCE/SGW/AMF/UPF device such as the NCE/MME/SGW/UDM/PCF/AMM/SMF 14 of FIG. 6. The NN 12 may perform functionalities of an MME (Mobility Management Entity) or SGW (Serving Gateway), such as a User Plane Functionality, and/or an Access Management functionality for LTE and similar functionality for 5G.

The NN 13 can comprise a mobility function device such as an AMF or SMF, further the NN 13 may comprise a NR/5G Node B or possibly an evolved NB a base station such as a master or secondary node base station (e.g., for NR or LTE long term evolution) that communicates with devices such as the NN 12 and/or UE 10 and/or the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the NN 12 and the UE 10 or any other device using, e.g., link 11 or another link. These links maybe wired or wireless or both and may implement, e.g., an X2 or Xn interface. Further, as stated above the link 11 may be through other network devices such as, but not limited to an NCE/MME/SGW device such as the NCE/MME/SGW/UDM/PCF/AMM/SMF 14 of FIG. 6.

The one or more buses of the device of FIG. 6 may be address, data, or control buses, and may include any interconnection mechanism, such as a series of lines on a motherboard or integrated circuit, fiber optics or other optical communication equipment, wireless channels, and the like.

For example, the one or more transceivers TRANS 12D, TRANS 13D and/or TRANS 10D may be implemented as a remote radio head (RRH), with the other elements of the NN 12 being physically in a different location from the RRH, and the one or more buses 157 could be implemented in part as fiber optic cable to connect the other elements of the NN 12 to a RRH.

It is noted that although FIG. 6 shows a network nodes Such as NN 12 and NN 13. Any of these nodes may can incorporate or be incorporated into an eNodeB or eNB or gNB such as for LTE and NR, and would still be configurable to perform example embodiments of the invention.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 may include a NCE/MME/SGW/UDM/PCF/AMM/SMF 14 that may include (NCE) network control element functionality, MME (Mobility Management Entity)/SGW (Serving Gateway) functionality, and/or serving gateway (SGW), and/or MME (Mobility Management Entity) and/or SGW (Serving Gateway) functionality, and/or user data management functionality (UDM), and/or PCF (Policy Control) functionality, and/or Access and Mobility Management (AMM) functionality, and/or Session Management (SMF) functionality, and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF 14 is configurable to perform operations in accordance with example embodiments of the invention in any of an LTE, NR, 5G and/or any standards based communication technologies being performed or discussed at the time of this application. In addition, it is noted that the operations in accordance with example embodiments of the invention, as performed by the NN 12 and/or NN 13, may also be performed at the NCE/MME/SGW/UDM/PCF/AMM/SMF 14.

The NCE/MME/SGW/UDM/PCF/AMM/SMF 14 includes one or more processors DP 14A, one or more memories MEM 14B, and one or more network interfaces (N/W I/F(s)), interconnected through one or more buses coupled with the link 13 and/or 14. In accordance with the example embodiments these network interfaces can include X2 and/or Xn interfaces for use to perform the example embodiments of the invention. The one or more memories MEM 14B include computer program code PROG 14C. The one or more memories MEM14B and the computer program code PROG 14C are configured to, with the one or more processors DP 14A, cause the NCE/MME/SGW/UDM/PCF/AMM/SMF 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, and DP14A may be means for performing functions, such as controlling the UE 10, NN 12, NN 13, and other functions as described herein.

As similarly stated above example embodiments of this invention addresses mobility in a cellular and mobile communication system such as new radio (NR) and Long Term Evolution (LTE). More specifically, can relate to a handover, such as but not limited to a so-called "conditional handover" (CHO) and Dual Active Protocol Stack (DAPS) handover which have been specified for NR and LTE at the time of this application.

Further, as indicated above example embodiments of the invention propose a solution where the source node configures the UE with a condition on when to apply the reduced DAPS configuration of the source cell and inform the source MN about the start of DAPS handover. Then when the CHO execution condition is met later, the UE applies the DAPS target cell configuration and performs RACH access.

The solution includes at least the following main steps:
When source cell sends CHO configuration containing target DAPS configuration and CHO execution condition, source may also provide another container with source DAPS configuration and triggering condition for applying the source DAPS configuration,
The source DAPS configuration may be optional. If not present UE assumes default source DAPS configuration of PCell-only as the source DAPS configuration;
The triggering condition for applying the source DAPS configuration can be either,
Measurement ID/Measurement event, or,
Absolute offset (in terms of radio frames) from the reception of the CHO configuration, or,
Based on source radio link quality in-terms of BLER or RLC packet loss while waiting for CHO execution to be met, or,
Activation time to defer the start of DAPS (applying reduced source DAPS configuration) when receiving the CHO configuration;
On the triggering condition associated with source DAPS, UE sends RRC-Reconfiguration-complete indicating that source DAPS configuration is activated,
Network method to start DAPS data forwarding on reception of DAPS configuration activation from UE along with activation of configuration linked to this measurement.

Figure 4:
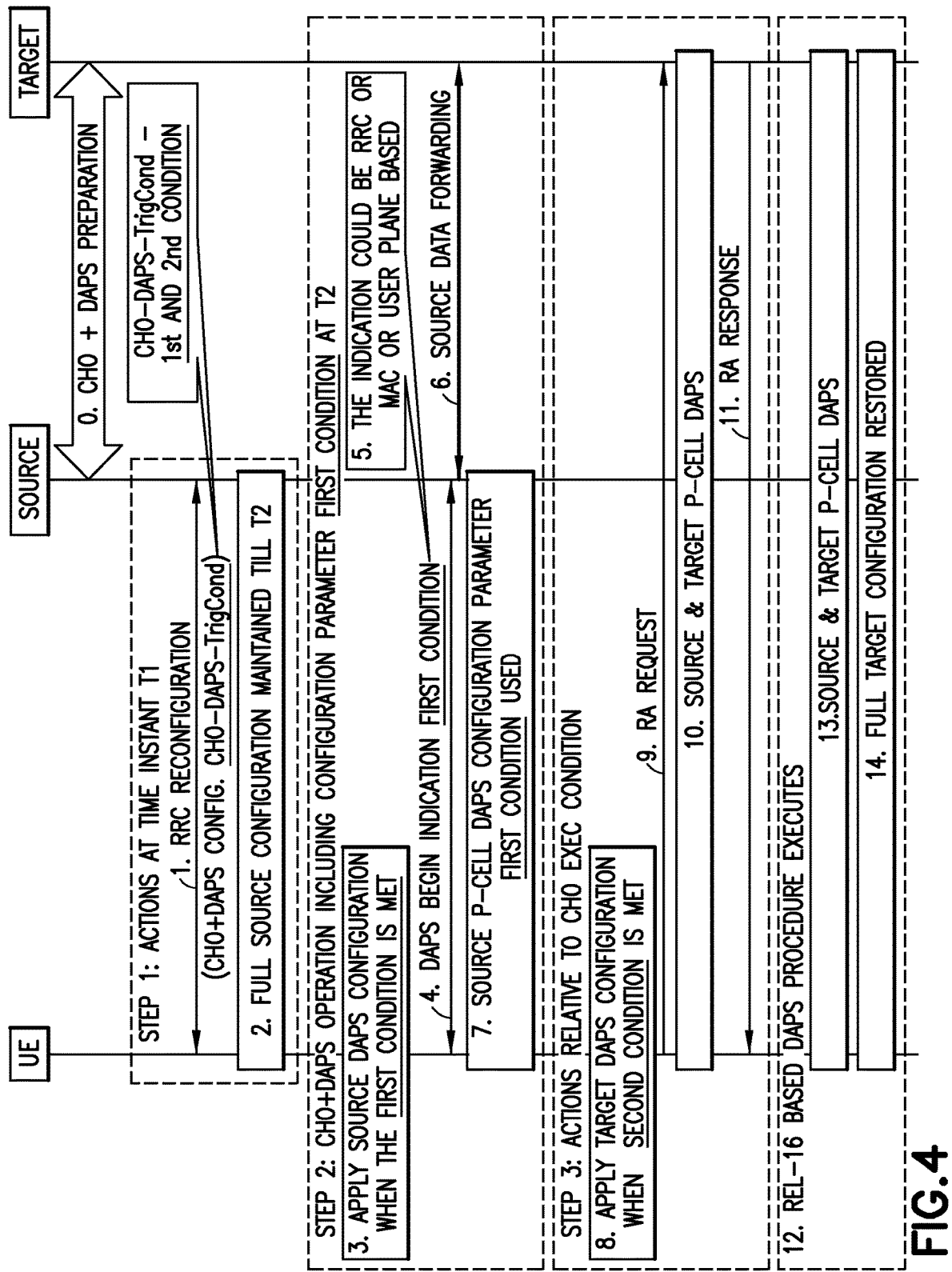
FIG. 4 shows steps in accordance with example embodiments of the invention (certain novel aspects underlined)

FIG. 4 shows steps in accordance with an example embodiment of the invention. It is noted FIG. 4 novel aspects as in accordance with example embodiments of the invention are shown as underlined in FIG. 4 and below.

The steps of one proposed method are shown in FIG. 4 as follows:
0.: Network decides to configure CHO+DAPS to the UE
Step 1:1. RRC reconfiguration containing CHO+DAPS Config with additional conditions set in {CHO-DAPS-Trig-Cond}:
The IE CHO-DAPS-TrigCond includes at least two conditions:
A first condition that informs the UE at which point it must apply the source DAPS configuration,
A second condition that informs the UE at which point it must apply the target DAPS configuration;
The network configures the parameters of the first and second conditions:

As a first example, the first condition could be set based on a radio condition or absolute time from the reception of CHO and DAPS configuration,
As a second example, the first condition could be based relative to the CHO execution condition (e.g. an offset in dB). For instance, if the second condition would trigger the CHO execution when $Mn>Ms+Off2$ where Mn and Ms are the measurement of serving and neighboring cell, respectively, the first condition could be the same as that of second condition but with an offset that is smaller than offset 2, i.e., $Mn>Ms+Off1$ where $Off1<Off2$.

Step 1:2 of FIG. 4: As a result of the above the full source PS throughput can be maintained until the time instant T2 occurs.

Step 2:3. 4. 5. of FIG. 4: The UE applies the source DAPS configuration when the first condition is met and let the source cell know that it has applied the source DAPS configuration. The indication to the source cell could be an RRC message, MAC CE or a user plane based (e.g. PDCP control message).

Step 2: 6. And 7 of FIG. 4: The source cell starts data forwarding to the prepared target cell Source P-Cell DAPS configuration parameter that First Condition is used and UE continues the radio communication with the source cell.

Step 3 of FIG. 4: UE applies target DAPS configuration and performs random access when the second condition is met.

Step 9. through 14. of FIG. 4 are the follow up of the Rel-16 DAPS procedure as discussed above.

Figure 5:
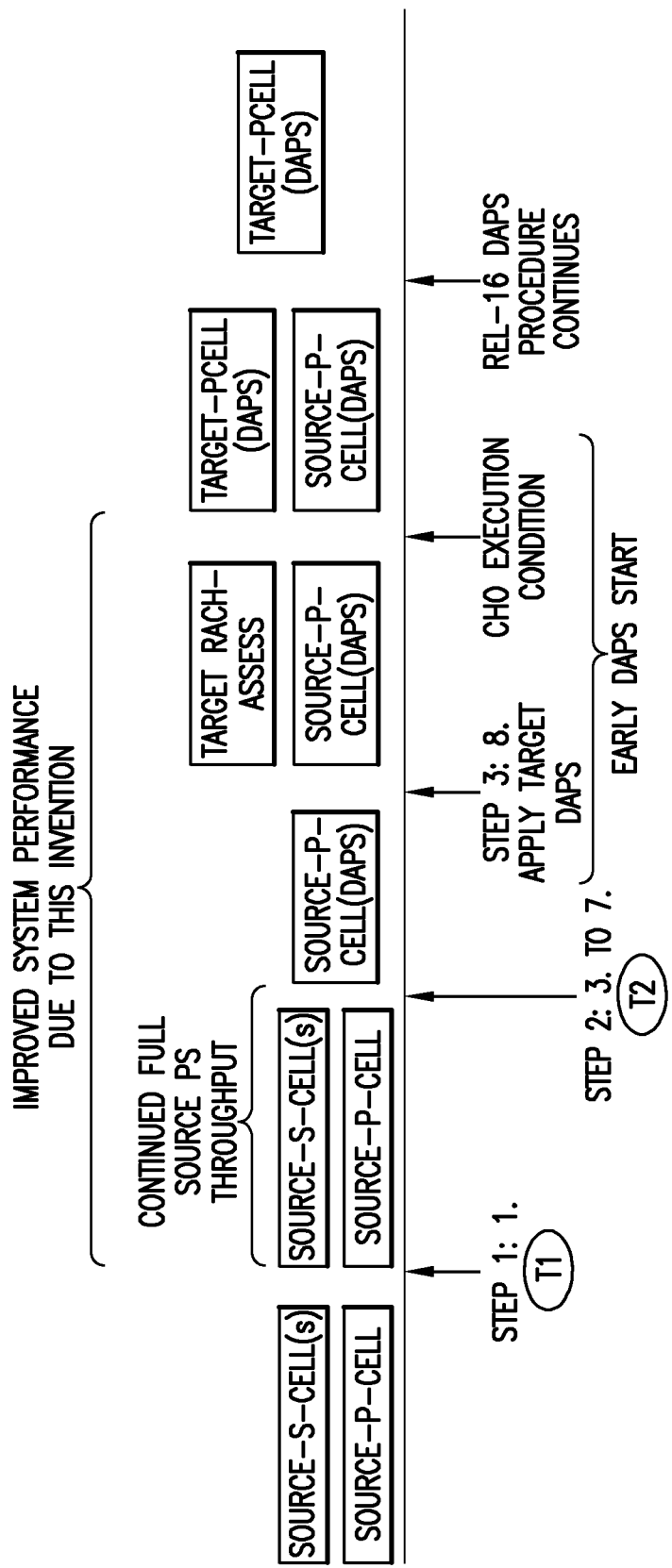
FIG. 5 shows a Time-line view of some invention steps in accordance with example embodiments of the invention.

FIG. 5 shows a Time-line view of invention steps in accordance with example embodiments of the invention. FIG. 5 shows some benefits and advantages of example embodiments of the invention over prior-art.

As shown in FIG. 5 there is improved system performance due to example embodiments of the invention at least between step 1:1 and a CHO execution condition. As shown between step 1:1 and step 2:3. To 7. of FIG. 5 there is a continued full source PS throughput to the Source-P-Cell with DAPS. Then as shown between step 3:8., where target DAPS is applied, and the CHO execution condition of FIG. 5 there is an early DAPS start. Further, as shown in FIG. 5 following the early DAPS start the Rel. 16 DAPS procedure can continue.

Figure 7A:
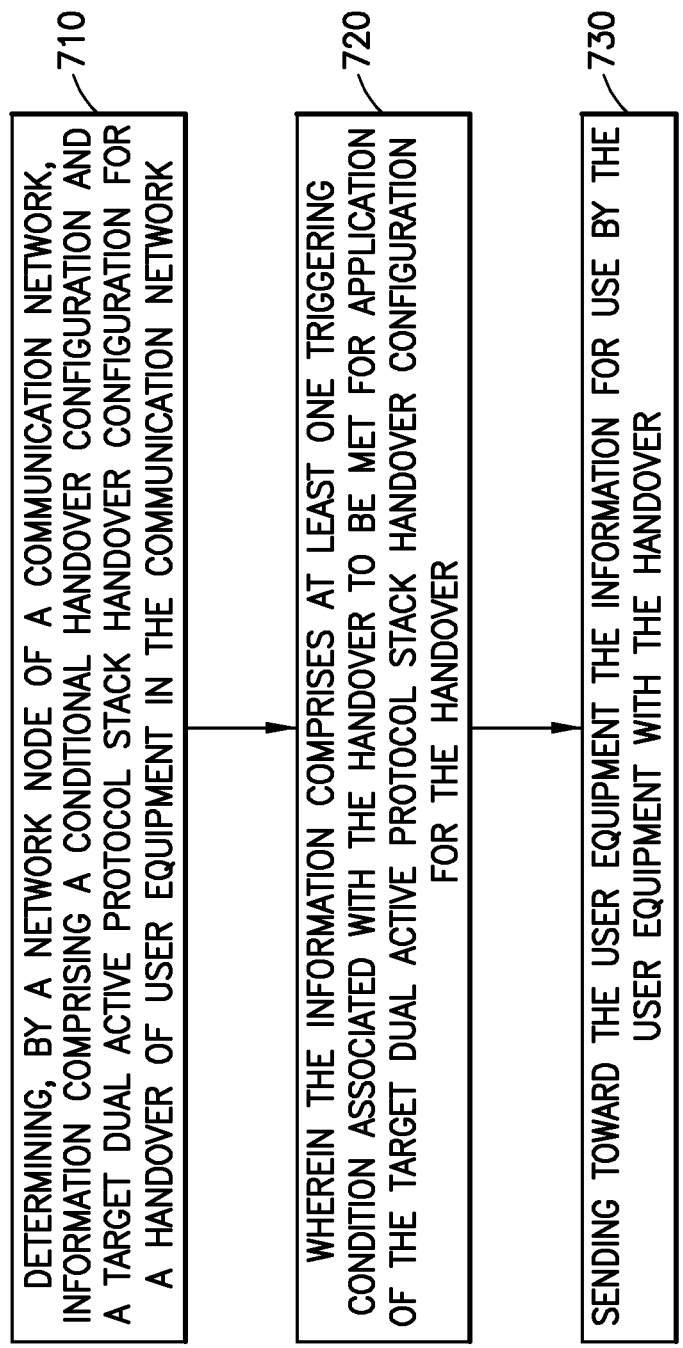
FIG. 7A and FIG. 7B each show a method in accordance with example embodiments of the invention which may be performed by an apparatus.
Figure 7B:
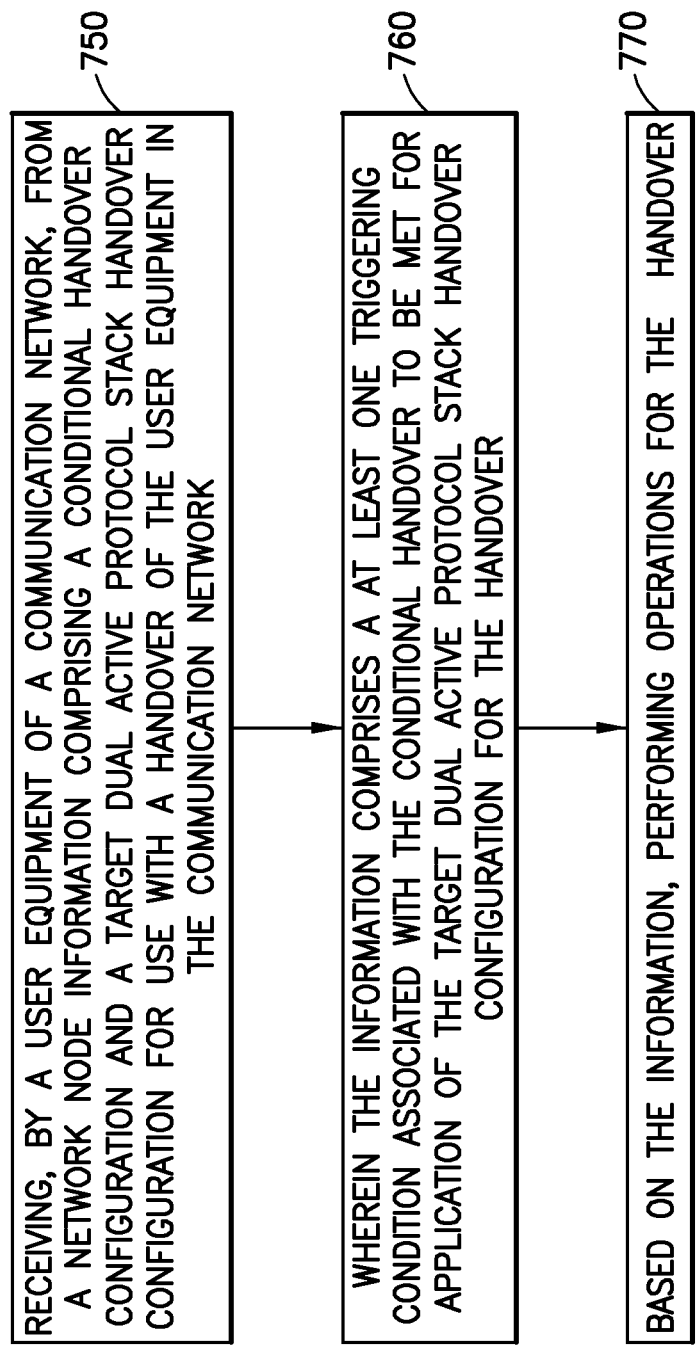

FIG. 7A and FIG. 7B each show a method in accordance with example embodiments of the invention which may be performed by an apparatus.

FIG. 7A illustrates operations which may be performed by a device such as, but not limited to, a device associated with the NN 12 and/or NN 13 as in FIG. 6. As shown in step 710 of FIG. 7A there is determining, by a network node of a communication network, information comprising a conditional handover configuration and a target dual active protocol stack handover configuration for a handover of user equipment in the communication network. As shown in step 720 of FIG. 7A wherein the information comprises at least one triggering condition associated with the handover to be met for application of the target dual active protocol stack handover configuration for the handover. Then as shown in step 730 of FIG. 7A there is sending toward the user equipment the information for use by the user equipment with the handover.

In accordance with an example embodiment of the invention as described in the paragraph above, wherein the information comprises a source dual active protocol stack handover configuration and a triggering condition for applying the source dual active protocol stack handover configuration.

In accordance with an example embodiment of the invention as described in the paragraphs above, wherein the at least one trigger condition comprises: a first condition informing the user equipment a point at which to execute the source dual active protocol stack configuration for the handover; and a second condition informing the user equipment a point at which to execute the target dual active protocol stack configuration for the handover.

In accordance with an example embodiment of the invention as described in the paragraphs above, wherein the handover comprises a conditional handover.

In accordance with an example embodiment of the invention as described in the paragraphs above, wherein the first condition is set for at least one of a radio condition or an absolute time from reception of the dual active protocol stack configuration and the conditional handover configuration.

In accordance with an example embodiment of the invention as described in the paragraphs above, wherein the first condition is set based on an absolute time from the reception of at least one of the conditional handover configuration or the target dual active protocol stack handover configuration.

In accordance with an example embodiment of the invention as described in the paragraphs above, the first condition is based on a dB offset relative to the conditional handover configuration.

In accordance with an example embodiment of the invention as described in the paragraphs above, wherein the first condition is set based on measurements of a serving cell and a neighbor cell and a second offset from reception by the user equipment of the conditional handover configuration.

In accordance with an example embodiment of the invention as described in the paragraphs above, wherein triggering the second condition is triggering the handover execution when Mn>Ms+Off2, where Off2 is the second offset, and where Mn and Ms are measurements of a neighbouring cell and a serving cell, respectively.

In accordance with an example embodiment of the invention as described in the paragraphs above, wherein the first condition is the same as the second condition but with a first offset from reception of the conditional handover configuration being smaller than the second offset.

In accordance with an example embodiment of the invention as described in the paragraphs above, wherein Mn>Ms+Off1 where Off1<Off2, where Off1 is the first offset, Off2 is the second offset, and where Mn and Ms are the measurement of a neighbouring cell and a serving cell, respectively.

In accordance with an example embodiment of the invention as described in the paragraphs above, there is receiving from the user equipment an indication of the first condition being met; and receiving another indication of the source dual active protocol stack handover configuration being used based on the first condition being met.

A non-transitory computer-readable medium (MEM 12B and/or MEM 13B as in FIG. 6) storing program code (PROG 12C and/or PROG 13C as in FIG. 6), the program code executed by at least one processor (DP 12A and/or DP 13A as in FIG. 6) to perform the operations as at least described in the paragraphs above.

In accordance with an example embodiment of the invention as described above there is an apparatus comprising: means for determining (TRANSCEIVERS 12D and/or TRANSCEIVERS 13D; MEM 12B and/or MEM 13B; PROG 12C and/or PROG 13C; and DP 12A and/or DP 13A as in FIG. 6), by a network node (NN12 and/or NN13 as in FIG. 6) of a communication network (Network 1 as in FIG. 6), information comprising a conditional handover configuration and a target dual active protocol stack handover configuration for a handover of user equipment (UE 10 as in FIG. 6) in the communication network, wherein the information comprises at least one triggering condition associated with the handover to be met for application (TRANSCEIVERS 12D and/or TRANSCEIVERS 13D; MEM 12B and/or MEM 13B; PROG 12C and/or PROG 13C; and DP 12A and/or DP 13A as in FIG. 6) of the target dual active protocol stack handover configuration for the handover; and means for sending (TRANSCEIVERS 12D and/or TRANSCEIVERS 13D; MEM 12B and/or MEM 13B; PROG 12C and/or PROG 13C; and DP 12A and/or DP 13A as in FIG. 6) toward the user equipment the information for use by the user equipment with the handover.

In the example aspect of the invention according to the paragraph above, wherein at least the means for determining, configuring, and sending comprises a transceiver [TRANSCEIVERS 12D and/or TRANSCEIVERS 13D as in FIG. 6] a non-transitory computer readable medium [MEM 12B and/or MEM 13B as in FIG. 6] encoded with a computer program [PROG 12C and/or PROG 13C as in FIG. 6] executable by at least one processor [DP 12A and/or DP 13A as in FIG. 6].

FIG. 7B illustrates operations which may be performed by a device such as, but not limited to, a device associated with the UE 10 as in FIG. 6. As shown in step 750 of FIG. 7B there is receiving, by a user equipment of a communication network, from a network node information comprising a conditional handover configuration and a target dual active protocol stack handover configuration for use with a handover of the user equipment in the communication network. As shown in step 760 of FIG. 7B wherein the information comprises at least one triggering condition associated with the conditional handover to be met for application of the target dual active protocol stack handover configuration for the handover. Then as shown in step 770 of FIG. 7B there is based on the information, performing operations for the handover.

In accordance with an example embodiment of the invention as described in the paragraph above, wherein the information comprises a source dual active protocol stack handover configuration and a triggering condition for applying the source dual active protocol stack handover configuration.

In accordance with an example embodiment of the invention as described in the paragraphs above, wherein the at least one trigger condition comprises: a first condition informing the user equipment a point at which to execute the source dual active protocol stack configuration for the handover; and a second condition informing the user equipment a point at which to execute the target dual active protocol stack configuration for the handover.

In accordance with an example embodiment of the invention as described in the paragraphs above, wherein the handover comprises a conditional handover.

In accordance with an example embodiment of the invention as described in the paragraphs above, wherein the first condition is set for at least one of a radio condition or an absolute time from reception of the dual active protocol stack configuration and the conditional handover configuration.

In accordance with an example embodiment of the invention as described in the paragraphs above, wherein the first condition is set based on an absolute time from the reception of at least one of the conditional handover configuration or the target dual active protocol stack handover configuration.

In accordance with an example embodiment of the invention as described in the paragraphs above, wherein the first condition is set based on a dB offset relative to the conditional handover configuration.

In accordance with an example embodiment of the invention as described in the paragraphs above, wherein the first condition is set based on measurements of a serving cell and a neighbor cell and a second offset from reception by the user equipment of the conditional handover configuration.

In accordance with an example embodiment of the invention as described in the paragraphs above, wherein triggering the second condition is triggering the handover execution when Mn>Ms+Off2, where Off2 is the second offset, and where Mn and Ms are measurements of a neighbouring cell and a serving cell, respectively.

In accordance with an example embodiment of the invention as described in the paragraphs above, wherein the first condition is the same as the second condition but with a first offset from reception of the conditional handover configuration being smaller than the second offset.

In accordance with an example embodiment of the invention as described in the paragraphs above, wherein Mn>Ms+Off1 where Off1<Off2, where Off1 is the first offset, Off2 is the second offset, and where Mn and Ms are the measurement of neighbouring cell and a serving cell, respectively.

In accordance with an example embodiment of the invention as described in the paragraphs above, there is, based on the first condition being met, applying the source dual active protocol stack configuration.

In accordance with an example embodiment of the invention as described in the paragraphs above there is communicating with the network node an indication of applying the source dual active protocol stack configuration based on the first condition being met.

In accordance with an example embodiment of the invention as described in the paragraphs above there is, based on the second condition being met, applying the target dual active protocol stack configuration and performing the conditional handover.

In accordance with an example embodiment of the invention as described in the paragraphs above there is applying the target dual active protocol stack configuration based on the second condition being met.

A non-transitory computer-readable medium (MEM 10B as in FIG. 6) storing program code (PROG 10C as in FIG. 6), the program code executed by at least one processor (DP 10A as in FIG. 6) to perform the operations as at least described in the paragraphs above.

In accordance with an example embodiment of the invention as described above there is an apparatus comprising: means for receiving (TRANSCEIVERS 10D, MEM 10B; PROG 10C; and DP10A as in FIG. 6) by a user equipment (UE 10 as in FIG. 6) of a communication network (Network 1 as in FIG. 6), from a network node (NN12 and/or NN13 as in FIG. 6) information comprising a conditional handover configuration and a target dual active protocol stack handover configuration for use with a handover of the user equipment in the communication network. As shown in step 760 of FIG. 7B wherein the information comprises at least one triggering condition associated with the conditional handover to be met for application (TRANSCEIVERS 10D, MEM 10B; PROG 10C; and DP10A as in FIG. 6) of the target dual active protocol stack handover configuration for the handover (TRANSCEIVERS 10D, MEM 10B; PROG 10C; and DP10A as in FIG. 6). Then as shown in step 770 of FIG. 7B there is based on the information, performing operations (TRANSCEIVERS 10D, MEM 10B; PROG 10C; and DP10A as in FIG. 6) for the handover.

In the example aspect of the invention according to the paragraph above, wherein at least the means for receiving and performing comprises a transceiver [TRANSCEIVERS 10D as in FIG. 6] a non-transitory computer readable medium [MEM 10B as in FIG. 6] encoded with a computer program [PROG 10C as in FIG. 6] executable by at least one processor [DP 10A as in FIG. 6].

It is submitted that benefits and advantages of the invention over prior-art include at least:

1. Reliable start of source-DAPS operation before the CHO execution condition is met, yet not too early when the CHO and DAPS configuration is provided;
2. The full configuration of the source cell (including SCells) is maintained till the first condition is met which keeps the throughput enhancements of the SCells as long as possible; and
3. De-coupling the time instant the UE applies the reduced source configuration from 1) the time instant the UE receives CHO and DAPS configurations and 2) from the time instant the UE performs random access to the target cell which provides throughput enhancements, yet without risking the mobility robustness gains of CHO.

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:

(a) hardware-only circuit implementations (such as implementations in only analog and/or digital circuitry);
(b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
(c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this ' circuitry' as may be used herein refers to at least the following:

(a) hardware-only circuit implementations (such as implementations in only analog and/or digital circuitry); and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" as may be used herein is to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. An apparatus, comprising:
at least one processor; and
at least one non-transitory memory including computer program code, wherein the at least one non-transitory memory including the computer program code is configured with the at least one processor to cause the apparatus to:
determine, by a network node of a communication network, information comprising a conditional handover configuration and a target dual active protocol stack handover configuration for a handover of user equipment in the communication network,
wherein the information comprises at least one triggering condition associated with the handover to be met for application of the target dual active protocol stack handover configuration for the handover; and
send toward the user equipment the information for use by the user equipment with the handover,
wherein the at least one trigger condition comprises:
a first condition informing the user equipment a point at which to execute the source dual active protocol stack configuration for the handover; and
a second condition informing the user equipment a point at which to execute the target dual active protocol stack configuration for the handover,
wherein the first condition comprises:
being set based on a radio condition, an absolute time from reception of the target dual active protocol stack configuration, the conditional handover configuration, and the conditional handover configuration;
being based on a dB offset relative to the conditional handover configuration; and
being set based on measurements of a serving cell and a neighbor cell and a second offset from reception by the user equipment of the conditional handover configuration.

2. The apparatus of claim 1, wherein the information comprises a source dual active protocol stack handover configuration and a triggering condition for applying the source dual active protocol stack handover configuration.

3. The apparatus of claim 1, wherein the handover comprises a conditional handover.

4. The apparatus of claim 1, wherein triggering the second condition is triggering the handover execution when Mn>Ms+Off2, where Off2 is the second offset, and where Mn and Ms are measurements of a neighbouring cell and a serving cell, respectively.

5. The apparatus of claim 1, wherein the first condition is the same as the second condition but with a first offset from reception of the conditional handover configuration being smaller than the second offset.

6. The apparatus of claim 1, wherein Mn>Ms+Off1 where Off1<Off2, where Off1 is the first offset, Off2 is the second offset, and where Mn and Ms are the measurement of a neighbouring cell and a serving cell, respectively.

7. The apparatus of claim 1, wherein the at least one non-transitory memory including the computer program code is configured with the at least one processor to cause the apparatus to:
receive from the user equipment an indication of the first condition being met; and
receive another indication of the source dual active protocol stack handover configuration being used based on the first condition being met.

8. An apparatus, comprising:
at least one processor; and
at least one non-transitory memory including computer program code, wherein the at least one non-transitory memory including the computer program code is configured with the at least one processor to cause the apparatus to:
receive, by a user equipment of a communication network, from a network node information comprising a conditional handover configuration and a target dual active protocol stack handover configuration for use with a handover of the user equipment in the communication network,
wherein the information comprises at least one triggering condition associated with the conditional handover to be met for application of the target dual active protocol stack handover configuration for the handover;
on the triggering condition associated with a source dual active protocol stack, send a radio resource control-reconfiguration-complete indicating that the source dual active protocol stack is activated; and
based on the information, perform operations for the handover,
wherein the at least one trigger condition comprises: a first condition informing the user equipment a point at which to execute the source dual active protocol stack configuration for the handover; and a second condition informing the user equipment a point at which to execute the target dual active protocol stack configuration for the handover, wherein the first condition comprises:
being set based on a radio condition, an absolute time from reception of the target dual active protocol stack configuration, the conditional handover configuration, and the conditional handover configuration;
being based on a dB offset relative to the conditional handover configuration; and
being set based on measurements of a serving cell and a neighbor cell and a second offset from reception by the user equipment of the conditional handover configuration,
wherein the at least one non-transitory memory including the computer program code is configured with the at least one processor to cause the apparatus to:
communicate with the network node an indication of applying the source dual active protocol stack configuration based on the first condition being met, the indication to the network node being a radio resource control message, a MAC control element, or a user plane based control message,
wherein based on a second condition being met, the at least one non-transitory memory including the computer program code is configured with the at least one processor to cause the apparatus to:
apply the target dual active protocol stack configuration and perform the conditional handover.

9. The apparatus of claim 8, wherein the information comprises a source dual active protocol stack handover configuration and a triggering condition for applying the source dual active protocol stack handover configuration.

10. The apparatus of claim 9, wherein the handover comprises a conditional handover.

11. The apparatus of claim 10, wherein triggering the second condition is triggering the handover execution when Mn>Ms+Off2, where Off2 is the second offset, and where Mn and Ms are measurements of a neighbouring cell and a serving cell, respectively.

12. The apparatus of claim 11, wherein the first condition is the same as the second condition but with a first offset from reception of the conditional handover configuration being smaller than the second offset.

13. The apparatus of claim 12, wherein Mn>Ms+Off1 where Off1<Off2, where Off1 is the first offset, Off2 is the second offset, and where Mn and Ms are the measurement of neighbouring cell and a serving cell, respectively.

14. The apparatus of claim 13, wherein based on the first condition being met, at least one non-transitory memory including the computer program code is configured with the at least one processor to cause the apparatus to:
apply the source dual active protocol stack configuration.

* * * * *